July 21, 1925.

L. A. GRAHAM

ROAD INDICATOR

Filed March 27, 1925

1,546,928

Witness:

Inventor:
Louis A. Graham
By Wilkinson, Huxley, Byron & Knight
Attys

Patented July 21, 1925.

1,546,928

UNITED STATES PATENT OFFICE.

LOUIS A. GRAHAM, OF EVANSTON, ILLINOIS.

ROAD INDICATOR.

Application filed March 27, 1925. Serial No. 18,681.

*To all whom it may concern:*

Be it known that I, LOUIS A. GRAHAM, a citizen of the United States, residing at Evanston, in the county of Cook and State of Illinois, have invented certain new and useful Improvements in Road Indicators, of which the following is a specification.

The object of the present invention is to provide a ready and convenient means for indexing roads constituting routes connecting given points on a map on which roads are marked by numbers or other indicia; also to provide an index which will be suitable for indicating routes lying in a plurality of States or political subdivisions, each of which may have its own independent system of road marking; also to arrange the indexing subject-matter upon a vehicle that is movable to bring any route designation within view of the user to the exclusion of other route designations, and to cause the analysis of the route to be exposed to view simultaneously with the route index.

In carrying out the invention, each road indicator will preferably have all its routes related to a single point of departure, for instance, an important center of travel, and the movable vehicle upon which the several routings are arranged will be in the form of a disk rotatable upon a card or other foundation which will preferably have imprinted upon it a regional map which the index is intended to serve, as well as such explanatory legend and directions as may be necessary to render the device conveniently useful. The device as a whole will be particularly appropriate for use as an advertising novelty, to which end, it may carry any desired advertising matter.

In the accompanying drawing—

Figure 1:
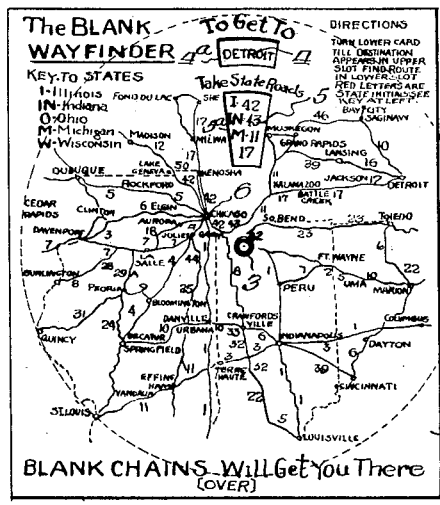
Figure 3:
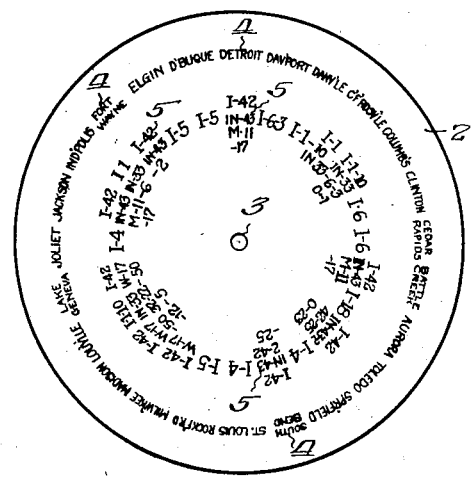
Figure 2:
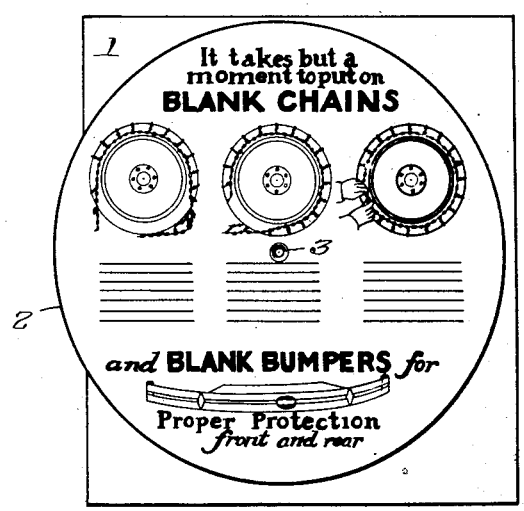

Figure 1 is an obverse view of the complete device; Figure 2 is a reverse view of the same; and Figure 3 is an obverse view of the index vehicle segregated from the base on which it is mounted.

1 represents a card, sheet, or the like, adapted to serve as a base, and to have printed upon it a regional map with routes of travel bearing numbers or other index characters corresponding to designations actually employed for such routes; and 2 represents a circular disk rotatably secured by an eyelet 3, or other suitable means, to the base 1, and having printed upon it in radial segments of its surface an annular series of indexes, each index consisting of a destination name 4 separately rendered visible by bringing it into registry with a window 4ª and without the confusion of presenting other places to view at the same time, and a routing 5 rendered visible to the exclusion of other routings by its registry with window 5ª. The map upon the base 1 will preferably show a region related to some central or important travel point 6, for instance, the city of Chicago, the destination names 4 will indicate places related to the central travel point lying within the range of the regional map, and the route designations 5 will be those roads of travel which collectively make up the accepted line of travel between the two points. Moreover, in giving the series of routes which collectively make up the line of travel between the two points, initials or other indication of the State or political division in which the route lies will be associated with the route number in order to avoid confusion of routes in different political divisions, and also for the important purpose of indicating the new route designation that must be looked for after crossing the line between two political divisions or States. To indicate the use of the device, let it be supposed that the base is to have a map of the region included within such radius from the city of Chicago as will include likely points of frequent travel, and it is desired to find the accepted line of travel from Chicago, as the central point, to the city of Detroit. The disk 2 is rotated relatively to the base 1 until the name "Detroit" becomes visible through the opening 4ª, when, simultaneously, there will appear in the opening 5ª the designations "I–42, IN–43, M–11," followed by the number "17," which will at once be interpreted to mean that in leaving Chicago the traveler takes the route marked 42 in Illinois until crossing the Indiana State line, when he will look for route 43, keep route numbered 43 until crossing the Michigan State line, and then take route 11 until it intersects with route 17, and then follow the last-named route to his destination. Of course, travel from any outside point to the central point of travel can be routed by merely following the series of indicated routes in reverse order.

The device is particularly convenient because it presents to view simultaneously the index name, the required information associated therewith, and the regional map upon which the information can be immediately applied and verified, and by which the information may be better appreciated, particularly in the matter of rightly judging the relative lengths of the different routes that go to make up the line of travel, general directions of travel, propinquity to other places, etc.

While the embodiment selected for illustrating the subject-matter of the present invention is in the form of a device to be held in the hands and manipulated, it is evident that the device can be made with any desired dimensions of the parts, and even of a size that would naturally be artificially supported while being manipulated, for instance, by mounting devices constructed and operating as herein described in situations commonly occupied by sign posts.

I claim:

1. A road indicator, comprising a base having printed upon it a map of a regional area related to a central point of travel, and a vehicle movably mounted upon the reverse side of said base and having printed upon it a series of data, each of which comprises the name of a destination related to the central point of travel within the regional scope of the map, and a series of index characters, respectively, indicating routings similarly marked upon the map and which collectively make up the line of travel between the two points; the base being constructed to disclose to view the collected destination of the index and the routing index appurtenant thereto while obscuring all other indexes.

2. A road indicator, comprising a base having printed upon it a regional map related to a central point of travel, with routes of travel thereon identified by index characters and a circular disk mounted revolubly upon the reverse side of the base, said base being perforated to successively expose limited radial segments of the disk, and said disk having printed upon it, in position to register with the perforate portion of the base, an annular series of radially disposed indexes, each of which consists of a destination element related to the central point of travel within the regional scope of the map, and route indicia simultaneously visible with the destination element and indicating the accepted line of travel between the destination and the central point.

Signed at Chicago, Illinois, this 16th day of March, 1925.

LOUIS A. GRAHAM.